United States Patent
Fuchs

[15] 3,661,028
[45] May 9, 1972

[54] COACTING PIN-IN-HOLE GEARS

[72] Inventor: Gyula S. Fuchs, 1422 Grace Avenue, Cleveland, Ohio 44102

[22] Filed: June 22, 1970

[21] Appl. No.: 48,022

[52] U.S. Cl. ..................................74/415, 74/416, 74/417
[51] Int. Cl. ...................F16h 1/12, F16h 1/06, F16h 1/14
[58] Field of Search ...................................74/416, 415, 417

[56] References Cited

UNITED STATES PATENTS 3,379,301  4/1968  Kopaska ............................74/415 X

FOREIGN PATENTS OR APPLICATIONS 28,184  12/1896  Great Britain..........................74/416
1,017,715  9/1952  France...................................74/416

Primary Examiner—Leonard H. Gerin
Attorney—Baldwin, Egan, Walling & Fetzer

[57] ABSTRACT

Coacting driving gears are disclosed, in certain embodiments each of the gears having an annular series of teeth and cavities for receiving the teeth, these teeth and cavities being alternately arranged and identically and evenly spaced in each of the series on the two gears so that the gears in driving relationship alternately have a tooth of a first of the gears entering into a cavity in the second of the gears, and immediately thereafter a tooth in the second gear enters into a cavity in the first gear. The axes of the two gears may be coplanar or with their axes arranged at 90° and with the axes of the coacting driving elements either arranged at ninety degrees to each other, or at a 45° arrangement. In certain embodiments where the axes of the gears are arranged at 90°, all of the teeth may be on one of the gears and all of the cavities may be on the other of the gears.

1 Claim, 10 Drawing Figures

INVENTOR
GYULA S. FUCHS
BY
Baldwin, Egan, Walling & Fetzer
ATTORNEYS

INVENTOR
GYULA S. FUCHS
BY

Baldwin, Egan, Welling & Fetzer.
ATTORNEYS

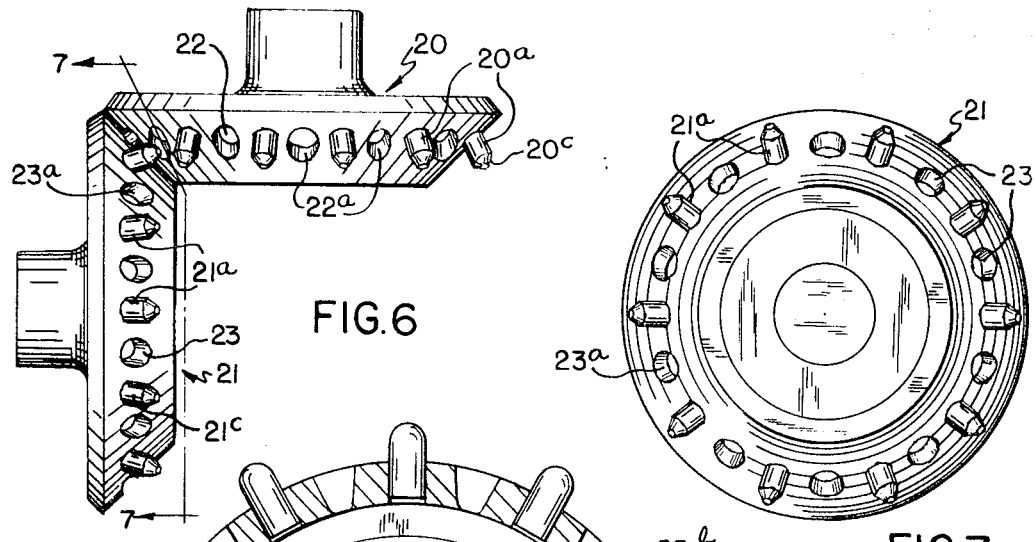
FIG.6
FIG.7
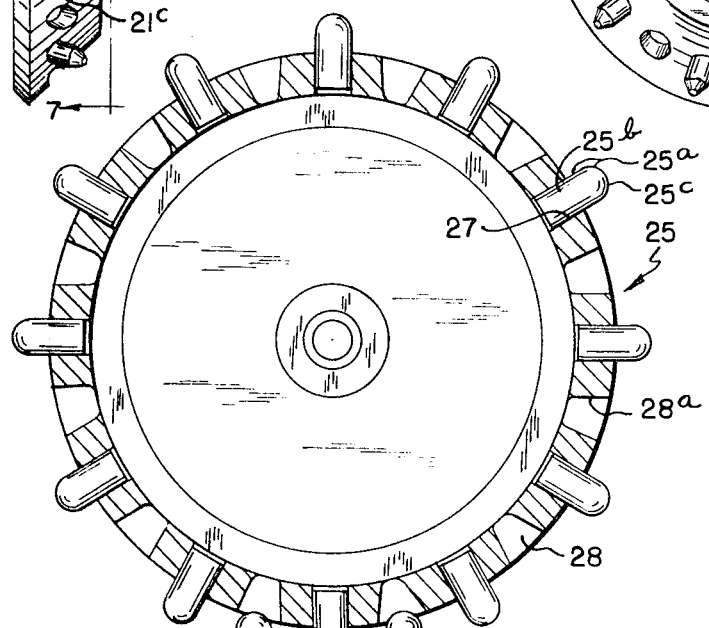
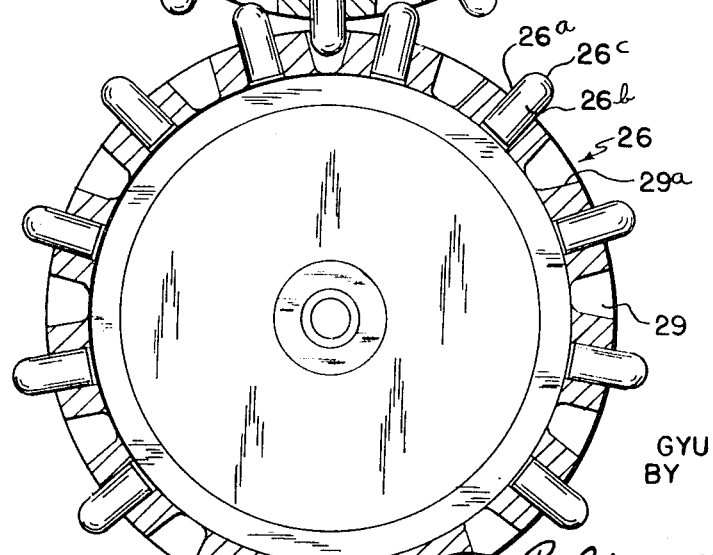
FIG.8
INVENTOR
GYULA S. FUCHS

INVENTOR
GYULA S. FUCHS
BY

Baldwin, Egan, Walling & Fetzer
ATTORNEYS

COACTING PIN-IN-HOLE GEARS

An object of the present invention is to provide coacting driving gears of very strong construction and adapted to transfer power at very high levels of energy in a very smooth manner and yet the construction is very efficient and simple and easy and cheap to repair, if necessary.

Other objects and advantages of this invention will be apparent in the accompanying drawings and specification and the essential features thereof will be set forth in the appended claims.

Figure 1:
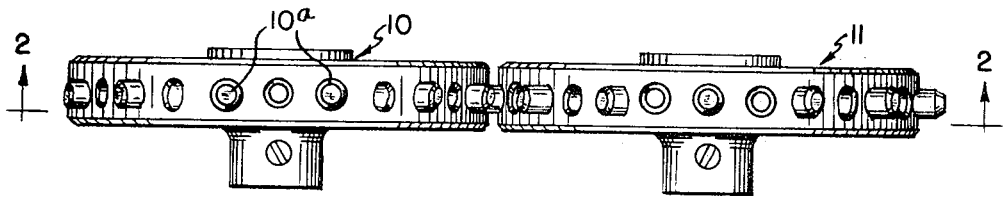
FIG. 1 shows a first embodiment of this invention showing an edge view of two gears which are coplanar and which have their axes parallel.
Figure 2:
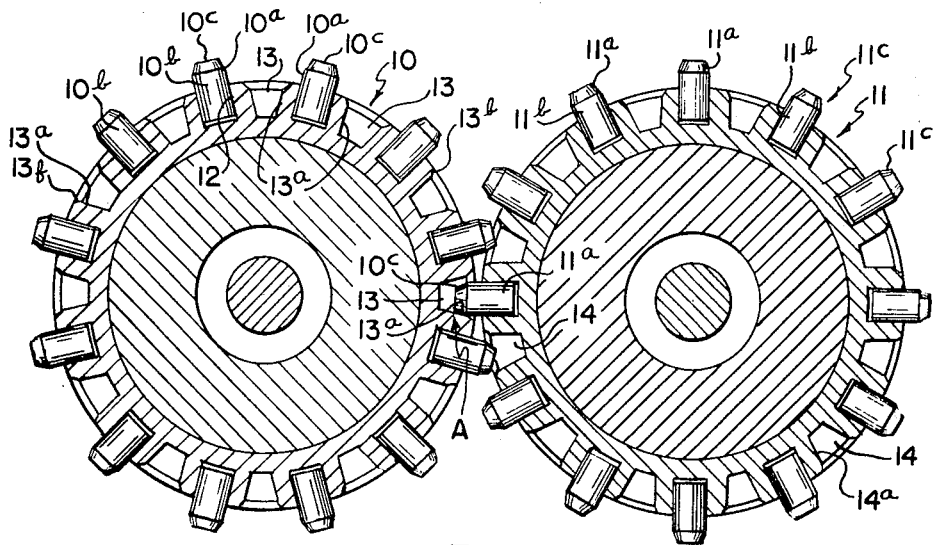
FIG. 2 is a central sectional view of the same taken along the line 2—2 of FIG. 1.
Figure 4:
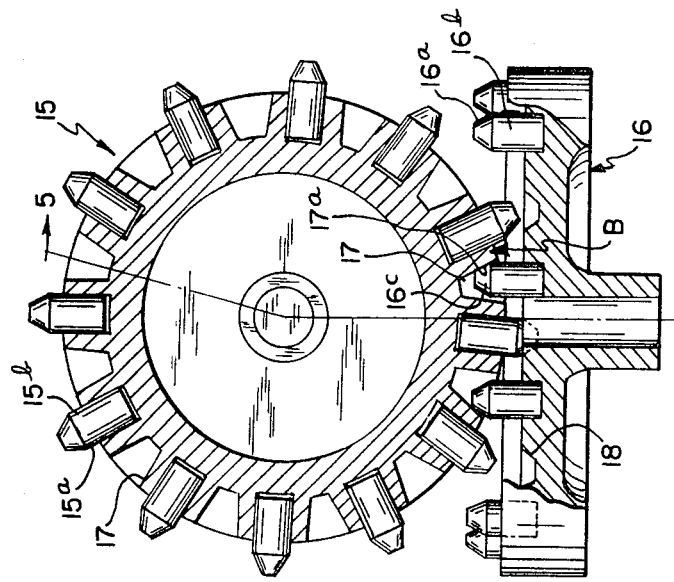
Figure 5:
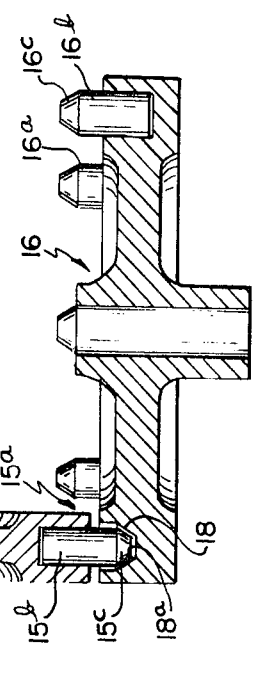
Figure 9:
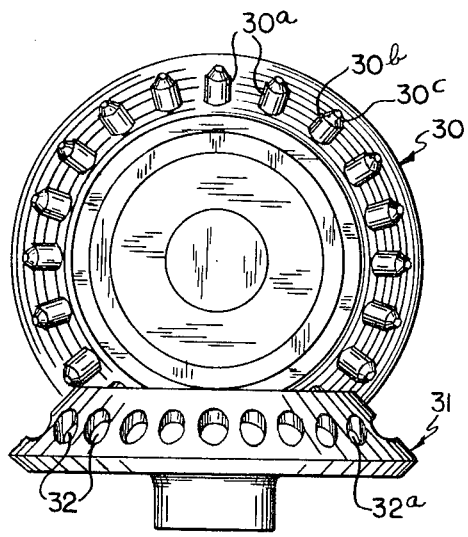
Figure 10:
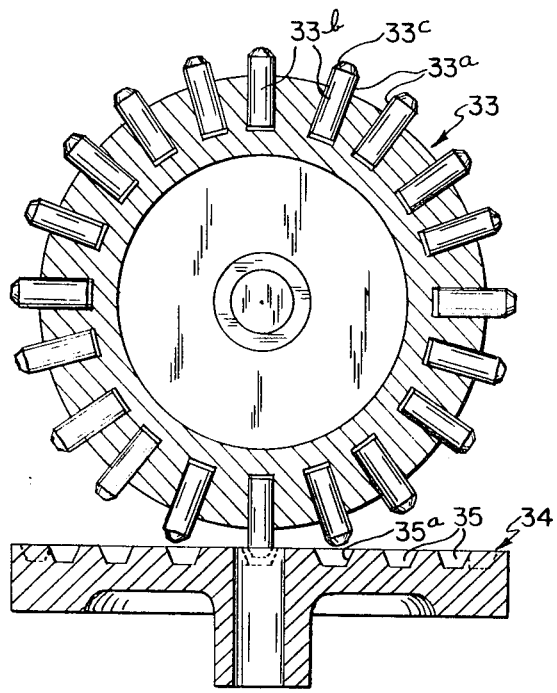

FIG. 4 is a view generally in section taken along the line 4—4 of FIG. 5, and showing two gears whose axes are coplanar and arranged at 90° angularity, wherein the axes of the driving elements of one of the gears lie in a common plane at right angles to the axis of the associated gear, and the axes of the driving elements of the second of the gears are all parallel to the axis of this second gear and lie in a circle which is tangent to the common plane of the driving elements of the first gear;

FIG. 5 is a sectional view of the same taken along the line 5—5 of FIG. 4;

FIG. 6 is a top plan view of two coacting gears whose axes are coplanar and arranged at 90° angularity, wherein the axes of the driving elements of the gears are inclined radially outwardly at an angle of 45° from the associated gear axis;

FIG. 7 is an elevational view of one of the gears of FIG. 6 taken generally along the line 7—7 of FIG. 6;

FIG. 8 shows two coacting gears coplanar in a manner similar to FIGS. 1 and 2 except that the driving elements of FIG. 8 are of a different shape;

FIG. 9 is a view like FIG. 6, except that all of the teeth are on one gear and all of the cavities are on the other gear, while FIG. 10 is a view like FIG. 4, except that all of the teeth are on one gear and all of the cavities are on the other gear.

An essential characteristic of this invention is that the coacting driving elements of two gears are mechanically simple and capable of such accurate production that the transmission of power between two such coacting gears is much smoother than that presently found in gears of regularly accepted type such as spur gears, cycloid and epicycloid gears, etc. At the same time the gear teeth and the coacting cavities which receive these teeth provide a simple, but very strong construction capable of handling powerful forces, and yet which is not possible with the more standard gears mentioned in the preceding paragraph.

Referring to FIGS. 1 and 2, two coacting intermeshing gears 10 and 11 are shown having their axes parallel and having the coacting driving elements substantially coplanar. In this particular example where the two gears have the same number of driving teeth, the gears are identical and one only need be described. The gear 10 has a plurality of teeth 10a, each tooth having a generally cylindrical portion 10b which is a press fit in a bore 12 in the gear blank. Each of these teeth has a male frusto-conical radially outer end 10c for coacting with a receiving cavity in the other gear as will presently appear. Between each pair of the teeth 10a there is provided a recess or cavity 13 opening radially outwardly. Each cavity has a female frusto-conical portion 13a wherein the side wall is inclined outwardly at an angle to a radius of gear 10 at an angle complementary to the inclination of the male frusto-conical portion 10c of a tooth 10a and so arranged that when a tooth 11a of gear 11 is in radial alignment with an associated cavity 13 of gear 10, the surfaces 10c and 13a are in substantially parallel line engagement as indicated at A in FIG. 2. Results from this construction at the transmission of power between one of the gears to the other are exceptionally smooth and accomplished with a minimum of friction. Each cavity 13 preferably has a radially outermost portion 13b which flares outwardly at an angle greater than the frusto-conical portion 13a so as to permit easy entrance of a coacting tooth into the cavity. It will be understood that the teeth 11a of gear 11 have substantially cylindrical portions 11b which are a press fit in the gear blank, and they also have radially outermost male frusto-conical portions 11c like those described at 10c. Also, the cavities 14 of gear 11 are like the cavities 13 described in connection with gear 10.

It will be noted that the teeth 10a and cavities 13 of gear 10 are alternately arranged, as are the teeth 11a and cavities 14 of gear 11. The driving elements, that is, the teeth and cavities of the two gears are identically and evenly spaced in the series on each gear so that the gears in driving relationship are arranged so that a tooth of gear 10 enters into a cavity 14 of gear 11, and immediately thereafter a tooth 11a of gear 11 enters into a cavity 13 of gear 10.

It will be recognized that if one of the gears in FIG. 2 was of a different diameter with a smaller or larger number of teeth than the other gear, the construction would be like that already described except that the elements on the two gears would be identically and evenly spaced in the sense that the pitch between the elements would be identical.

Figure 3:
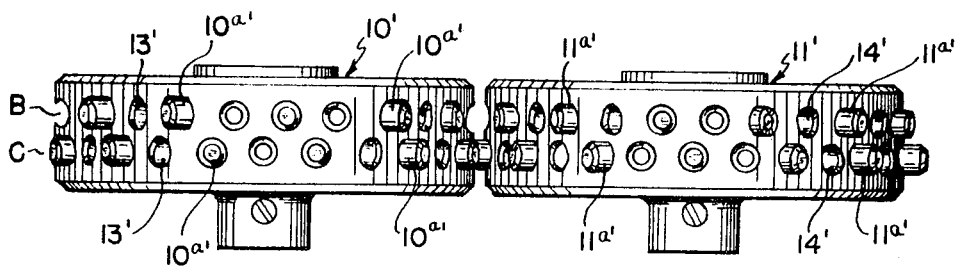
FIG. 3 is a view similar to FIG. 1, but showing how two parallel sets of driving elements may be provided on the coacting gears.

FIG. 3 shows a modification similar to that of FIGS. 1 and 2 except that a series of coacting driving elements are provided at the level B like those just described in connection with FIGS. 1 and 2, with a second series of coacting driving elements at the level C, also identical to those just described. It will be noted that the elements of series B are staggered with respect to the similar elements in series C of FIG. 3 as evidenced by the indicated staggering in gear 10' of the teeth 10a' and the cavities 13'. Likewise in gear 11' the teeth 11a' in B and C series are staggered and likewise the cavities 14' are staggered.

In the form of the invention shown in FIGS. 1 and 2, before one of the teeth 11a passes out of driving engagement with the cavity 13, as shown in FIG. 2, the tooth 10a of gear 10 will already have arrived into driving contact with the receiving cavity of gear 11. In contrast, in the arrangement shown in FIG. 3, a total of four teeth and four receiving cavities are in driving contact at all times.

In FIGS. 4 and 5 the invention is shown as applied to a gear 15 coacting with a gear 16, the axes of the two gears being coplanar as shown in FIG. 4 and arranged at 90° angularity as seen in FIG. 5. The teeth 15a and 16a on these two gears are the same shape as the teeth 10a and 11a already described insofar as they have a cylindrical portion 15b or 16b which are press fitted into the gear blanks and these teeth terminate in a radially outward male frusto-conical portion 15c and 16c respectively which coact with cavities 18 in gear 16 and cavities 17 in gear 15. Here again, when two driving elements are in driving engagement, the receiving cavity such as 17 in FIG. 4 has a female frusto-conical portion 17a which in full driving engagement meets in substantially parallel line engagement with the male frusto-conical portion 16c of one of the teeth 16a on gear 16 as indicated at B in FIG. 4. The frusto-conical portion 15c of each tooth 15a coacts in a similar manner with the outwardly flaring frusto-conical sidewall 18a of a coacting cavity 18 in the gear 16. It will be noted that the axes of the teeth 15b and cavities 17 of gear 15 lie in a common plane at right angles to the axis of gear 15, while the axis of the teeth 16a and cavities 18 of the gear 16 are all parallel to the axis of this gear and lie in a circle which, as seen in FIG. 5, is tangent to the common plane of the driving elements of gear 15.

In FIGS. 4 and 5, there is an annular series of teeth and cavities for receiving like teeth on each of the gears 15 and 16, with the teeth and cavities being alternately arranged and identically and evenly spaced in each of the series on each gear. The gears are in driving relationship arranged so that a tooth 15a of gear 15 enters a cavity 18 in gear 16, and immediately thereafter a tooth 16a in gear 16 enters into a cavity 17 in gear 15. As in the first-described embodiment, before one tooth in driving engagement leaves its receiving cavity, the next tooth has already engaged in a coacting cavity following.

In the modification of FIGS. 6 and 7, two identical gears 20 and 21 are shown arranged with their axes coplanar, but arranged at 90° angularity between them. The teeth 20a and 21a are like those previously described herein and are press fitted into their respective gear blanks. The cavities 22 and 23 are also like those already described. Each tooth 20a has a radially outermost portion 20c complementary to a female frusto-conical portion 23a of a receiving cavity 23. In like manner, each tooth 21a has a male frusto-conical outer end portion 21c complementary to a female frusto-conical wall 22a of a receiving cavity 22. The axes of the teeth 20a and of cavities 22 of gear 20 are inclined radially outwardly at an angle 45° from the axis of gear 20. In a like manner, the axes of teeth 21a and of cavities 23 of gear 21 are inclined radially outwardly at an angle of 45° from the axis of gear 21. Therefore, the structures shown in FIG. 6 and 7 provide a drive in all respects similar to a beveled gear drive. The modification shown in FIG. 8 is similar to that described in FIGS. 1 and 2. The gears 25 and 26 are identical. The axes of the two gears are parallel and the axes of the teeth and cavities in the two gears are substantially coplanar. The teeth 25a have generally cylindrical portions 25b which are a press fit and a receiving recess 27 in the gear blank. The outer end of each tooth 25c is substantially hemispherical. Each cavity 28 in gear 25 opens radially outwardly and the sidewalls provide a female frusto-conical portion 28a. In a like manner, gear 26 has teeth 26a having cylindrical portions 26b press fitted into the gear blank and having semi-spherical outer ends 26c. Each of the cavities in this gear at 29 has female frusto-conical portions 29a. It will be seen that each of the gears in FIG. 8 has an annular series of teeth and cavities, the same being alternately arranged and identically and evenly spaced in each of the gears so that the gears in driving relationship have a tooth of gear 25 entering into a receiving cavity in gear 26, and immediately thereafter a tooth of gear 26 enters into a cavity in gear 25. At all times, two teeth and their associated cavities are in driving relationship so as to provide a smooth and continuous driving force. The hemispherical outer ends 25c and 26c enter smoothly into driving engagement with the female frusto-conical portions 29a and 28a respectively in their associated receiving cavities.

In the modification of FIG. 9, a pair of bevel gears 30 and 31 are shown in meshing arrangement like the bevel gears of FIG. 6. Here, however, the difference is that all of the teeth 30a are on gear 30 while all of the receiving cavities 32 are provided on the gear 31. Here the gears 30 and 31 are shown arranged with their axes coplanar, and arranged at 90° angularity between them. The teeth 30a are like those previously described having a cylindrical portion 30b press fitted into a suitable recess in gear 30 and having an outer frusto-conical tip 30c. The frusto-conical portion 30c of each tooth is received in a frusto-conical portion 32a flaring outwardly in each recess 32 in a manner previously described in other embodiments of this invention.

In the modification of FIG. 10, gears 33 and 34 are shown in meshing engagement. Here again, the axes of gears 33 and 34 are coplanar, but arranged at 90° angularity between them. All of the teeth are provided in gear 33 and all of the receiving cavities are provided in gear 34 in contrast to the arrangement previously shown in FIG. 4. The axes of teeth 33a in gear 33 lie in a common plane at right angles to the axis of gear 33, while the axes of the receiving cavities 35 in gear 34 lie in a circle which is tangent to the common plane in which teeth 33a are located so that, in driving relationship, the teeth of gear 33 enter drivingly into the cavities 35 of gear 34. The teeth 33a have cylindrical portions 33b which are press fitted into suitable recesses in gear 33. The teeth have tip portions at their outer ends which are frusto-conical as indicated at 33c and these correspond to the flaring frusto-conical portions 35a of the outwardly flaring recesses of the cavities 35.

In the use of this invention, there is very little wear on the tooth receiving cavities and if a tooth is worn or broken, it is a simple matter to remove the cylindrical body portion of the tooth from its associated recess in the gear blank after which a new tooth can be press fitted in its place. Those skilled in the use of machine tools will recognize that the tooth receiving recesses, into which the teeth are press fitted, and the tooth receiving cavities between each pair of teeth, may be machined into the gear blank with their axes exactly radially aligned and the art of indexing a gear blank around its axis is so developed that the spacing of the axes of such recesses and cavities around the periphery of gear blank may be so exactly controlled that the coaction of a tooth in one gear with the receiving cavity in a coacting gear may be uniform around the periphery of the two gears so that smooth, continuous and almost frictionless driving action occurs with the use of this invention.

What is claimed is:

1. Coacting driving and driven gears comprising on each of said gears an annular series of pin shape teeth and cavities for receiving said teeth, said teeth and said cavities being alternately arranged and identically and evenly spaced in each of said series, each of said teeth being press fitted into an opening in its associated gear, each of said cavities being cup shape having a bottom in its associated gear, and said gear in driving relationship arranged each on its coacting concentric shaft so that a tooth of a first of said gears enters snugly into a cavity in a second of said gears and immediately thereafter a tooth in said second gear enters snugly into a cavity in said first gear, whereby neither of said gears can creep longitudinally of its associated shaft because of the continuous engagement of some of said teeth in some of said cavities.

* * * * *